United States Patent
Brass (10) Patent No.: US 7,275,493 B1
(45) Date of Patent: Oct. 2, 2007

(54) HYDROFOIL WATERCRAFT

(76) Inventor: Dwight S. Brass, 400 E. Richardson Springs Rd., Edgerton, WI (US) 53534

( * ) Notice: Subject to any disclaimer, the term of this patent is extended or adjusted under 35 U.S.C. 154(b) by 0 days.

(21) Appl. No.: 11/264,602

(22) Filed: Nov. 1, 2005

Related U.S. Application Data (63) Continuation-in-part of application No. 10/886,820, filed on Jul. 8, 2004, now abandoned.

(51) Int. Cl.
*B63B 1/30* (2006.01)
(52) U.S. Cl. .................. 114/272; 114/280; 114/282
(58) Field of Classification Search ............. 114/272, 114/273, 274, 282, 280
See application file for complete search history.

(56) References Cited

U.S. PATENT DOCUMENTS

| | | | | |
|---|---|---|---|---|
| 2,914,014 A | * | 11/1959 | Carl et al. ................. | 114/281 |
| 2,991,747 A | * | 9/1961 | Bader et al. ................. | 114/282 |
| 3,360,222 A | * | 12/1967 | West, Jr. ....................... | 244/54 |
| 3,762,355 A | | 10/1973 | Raynes ....................... | 114/66.5 |
| 4,080,922 A | | 3/1978 | Brubaker .................... | 114/282 |
| 4,132,378 A | * | 1/1979 | Stevens ....................... | 244/175 |

* cited by examiner

Primary Examiner—Sherman Basinger
(74) Attorney, Agent, or Firm—Donald J. Ersler (57) ABSTRACT

A watercraft capable of operating in hydrofoil mode or ground-effect mode with self-righting retractable V-shaped foil, fiberoptic control systems, and a plurality of aircraft style engines with variable pitch propellers for speed and direction control. The V-shaped foil can be fully retracted into the hull allowing operation in shallow water, and the ability to execute a beach landing. Propeller pitch can be reversed allowing the craft to backup. Each engine and propeller can be controlled individually allowing rotating in-place for precise maneuvering control. The hull is a flying wing, airfoil shape for efficient high-speed operation. Engine nacelles are located on airfoil shaped struts, angled in a V-shape, for self-righting effect at high speed. Fuel tanks are within the nacelles, thus outside the main hull for safety.

10 Claims, 7 Drawing Sheets

HYDROFOIL WATERCRAFT

CROSS-REFERENCE TO RELATED APPLICATIONS

This is a continuation-in-part application taking priority from Ser. No. 10/886,820 filed on Jul. 8, 2004 now abandoned.

BACKGROUND OF THE INVENTION

1. Field of the Invention

This invention relates to the field of high-speed watercraft and more specifically to a hydrofoil watercraft with a V-shaped adjustable hydrofoil and ground-effect mode.

2. Discussion of Prior Art

Originally, hydrofoil watercraft consisted of a conventional boat design with a hydrofoil wing attached. These early designs failed to overcome the speed limitation of a foil-in-water due to high drag and cavitation as the foil reached certain speeds. They were vulnerable to floating debris, especially as speeds increased, posing a serious safety risk for occupants. In addition, the hull was not aerodynamically efficient further limiting high-speed operation. Later designs attempted to streamline the hull and incorporated overly complex retractable designs. One design is U.S. Pat. No. 4,080,922 to Brubaker. The Brubaker patent uses complex rotatable foil elements that provide minimal lift when partially deployed at low speeds or in shallow water. Maximum lift is only available when fully extended, which hinders shallow water low speed transition to hydrofoil operation. Brubaker also uses a bow foil arrangement that provides a stepped lift due to multiple foil segments. This would result in erratic lift and control. Brubaker's cabin design with a downward sloping nose would pose serious washover problems when in displacement mode (called hullborne by Brubaker). Another design is U.S. Pat. No. 3,762,355 to Raynes. The Raynes patent uses a float plane design requiring wider wing span and thus limit dockside flexibility as well as the ground-effect advantage. Still other designs use submerged propellers for propulsion at low speeds limiting shallow water operation and increasing weight and complexity.

BRIEF SUMMARY

Object of Invention

The object of this invention is to provide a simplified high-speed watercraft that operates efficiently and safely at all speeds.

ADVANTAGES OF INVENTION

The invention is able to operate in very shallow water due to retractable V-shaped hydrofoil wing. Continuously adjustable V-shaped hydrofoil wing provides maximum lift at partial extension for lower speed transition to hydrofoil mode, especially in shallow water. This design also provides inherent stability due to the inwardly angled lift vectors causing a self-righting operation. Fly-by-fiber controls greatly reduce electrical noise susceptibility and simplify operation. Reversible dual air propellers give simpler, more reliable control of speed, direction, and rotation in-place capability. Independently operable elevators control pitch and roll simply and effectively. All controls remain above water in all modes thus eliminating marine related maintenance and reliability problems. Incorporated strain gages provide feedback to operator for smooth transitions from mode to mode.

DETAILED DESCRIPTION

Cabin

A watercraft 1 includes a streamlined hull 23 with a flying wing shape (airfoil) for maximum lift and minimum drag when operating in ground-effect mode. Cabin access is through a watertight side door 29.

Power

Figure 1:
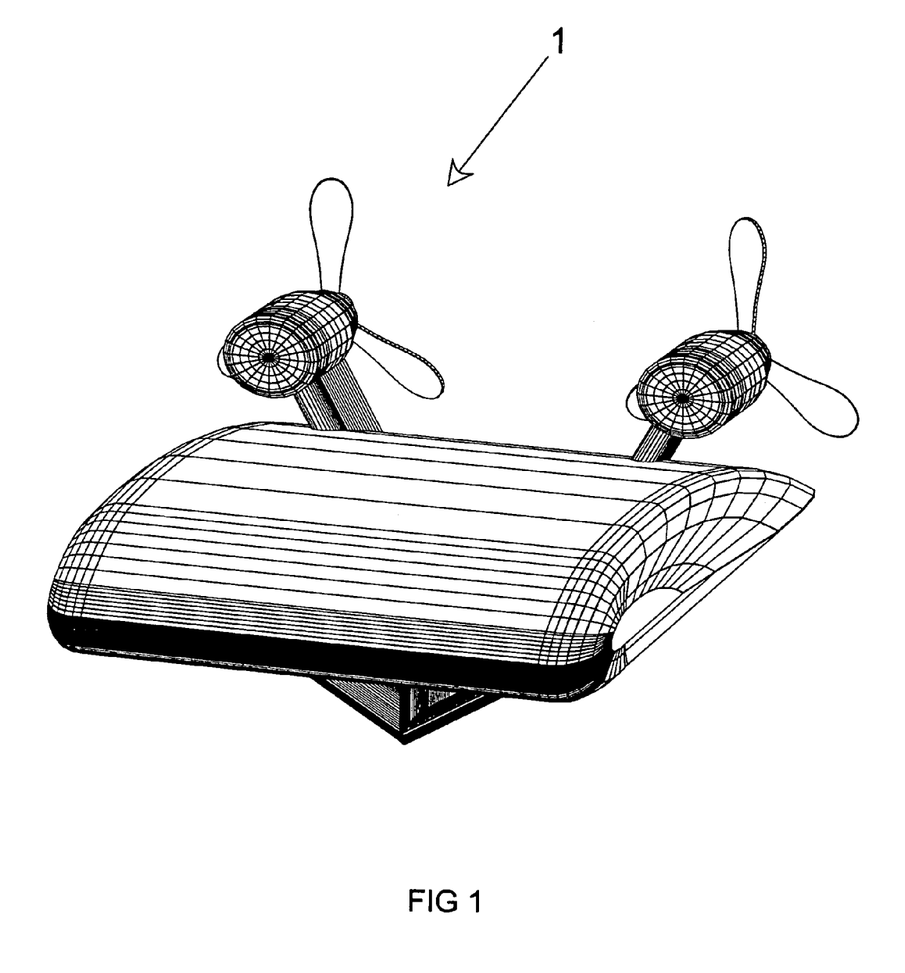
FIG. 1 is a perspective view of a watercraft with a hydrofoil fully deployed
Figure 2:
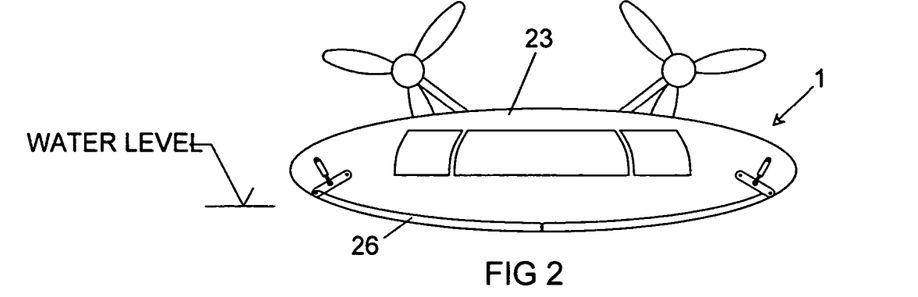
FIG. 2 is a front elevation view of a watercraft in low-speed displacement mode with a V-shaped hydrofoil wing fully retracted.
Figure 3:
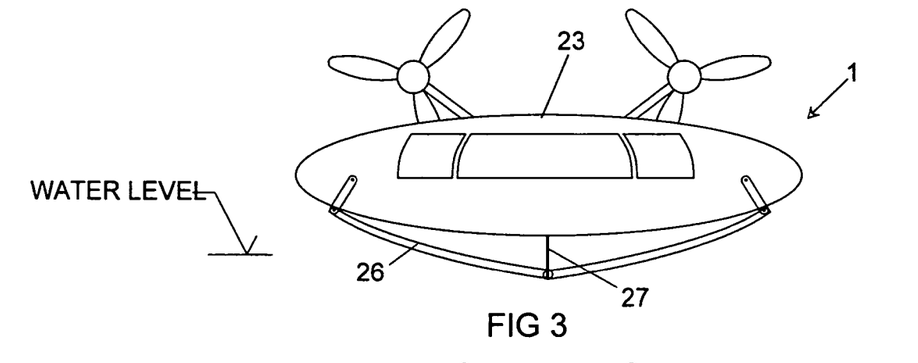
FIG. 3 is a front elevation view of a watercraft at moderate speed with a V-shaped hydrofoil wing partially extended.
Figure 4:
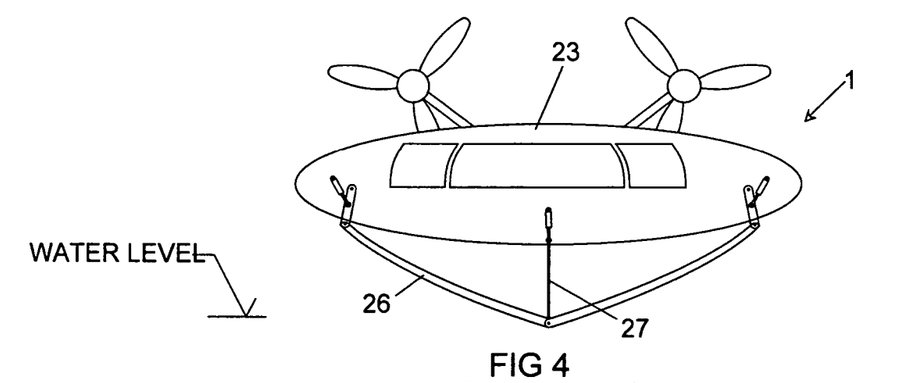
FIG. 4 is a front elevation view of a watercraft at moderately high speed with a V-shaped hydrofoil wing fully extended.
Figure 5:
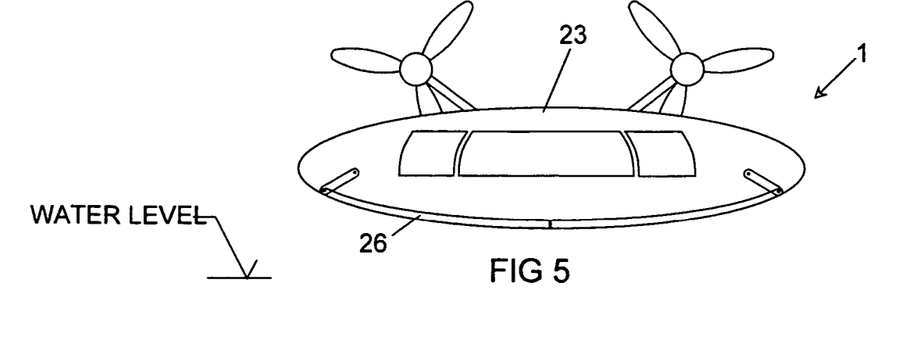
FIG. 5 is a front elevation view of a watercraft in a high-speed ground-effect mode with a V-shaped hydrofoil wing fully retracted
Figure 6:
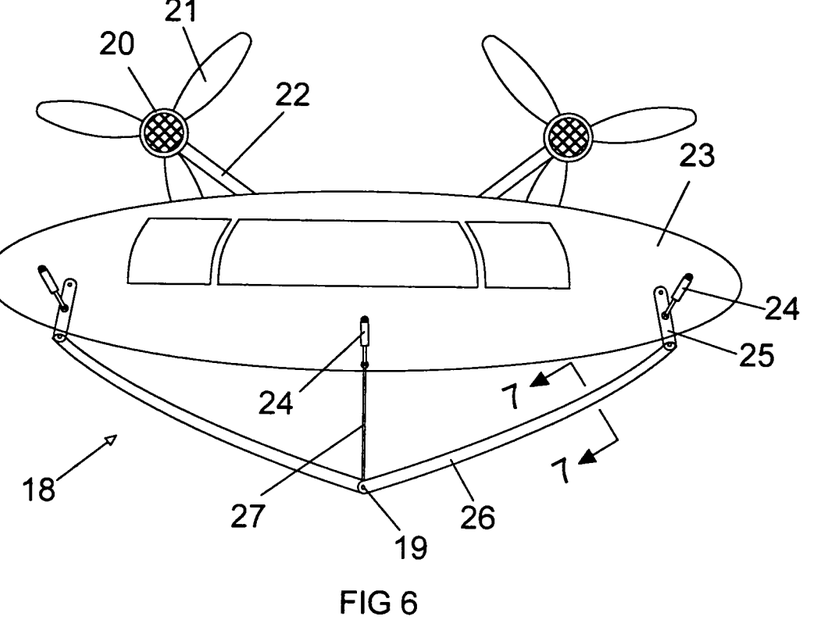
FIG. 6 is a front elevation view showing a V-hull control mechanism of a watercraft.
Figure 7:
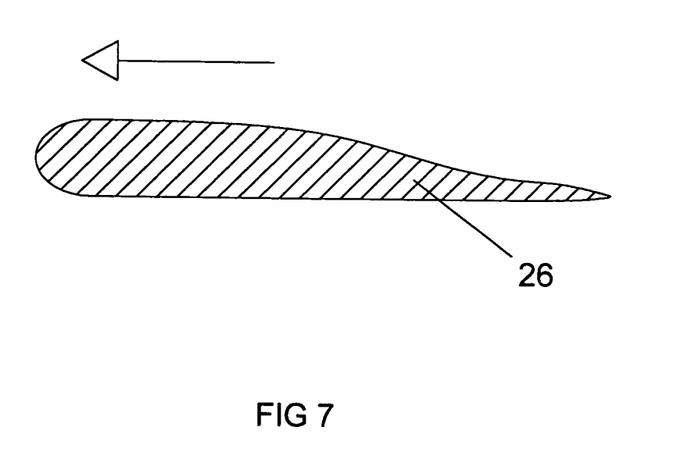
FIG. 7 is a cross sectional view of a V-shaped hydrofoil wing of a watercraft.
Figure 8:
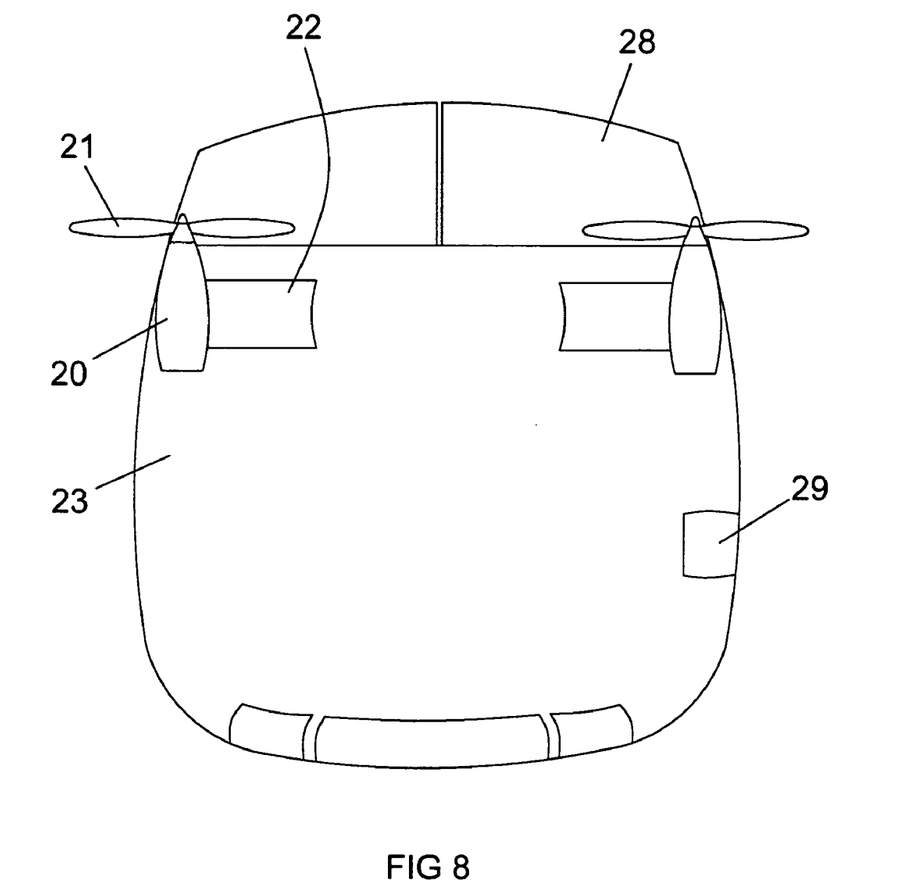
FIG. 8 is a top view of a watercraft illustrating tail elevators.
Figure 9:
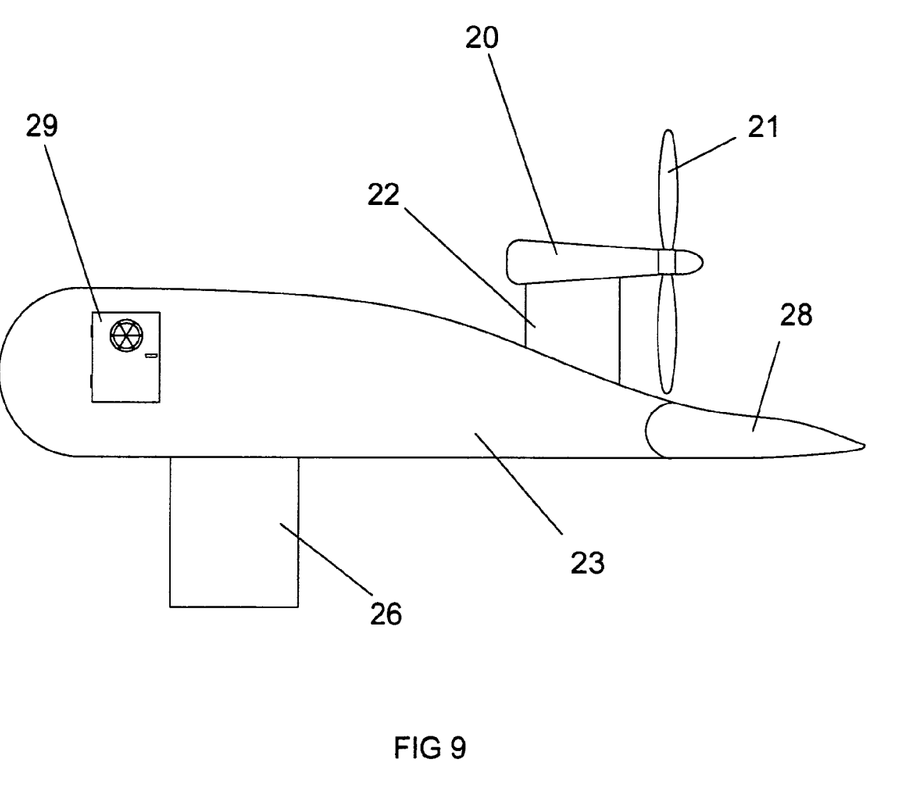
FIG. 9 is a side view of a watercraft.

Control of the watercraft 1 includes of a plurality of aircraft-style engines, positioned outside the main hull in a nacelles 20 that also house fuel tanks. This separates fuel and engines from passengers for improved safety. The nacelles 20 are attached to angled struts 22 with an airfoil cross-section as illustrated in FIG. 7.

Control

At high speed, the angled struts 22 exert a self-righting force in the case of left or right tilt (roll motion). The distinct arrangement causes the lower side to provide more vertical force returning the watercraft 1 to level operation. Each engine is individually controlled, and fitted with individually controlled variable-pitch air propellers 21. At any given engine speed the thrust of each propeller 21 can be adjusted by changing the pitch. This allows the operator to steer the watercraft 1 by simply changing propeller pitch as well as individual engine speed. The propellers 21 are a type that allows the pitch to be changed so that thrust may be reversed. This gives the watercraft 1 the distinct ability to move backwards at slow speed, which is useful when moving away from a dock or beach landing. With one propeller 21 pitched for forward thrust and the other pitched for reverse thrust the watercraft 1 can rotate in place for precise maneuverability. The reversible air propellers 21 allow backing away from the dock or beach with a simple reversing of pitch. No underwater propellers are used, or required. At the rear of the cabin, flush with the airfoil hull 23 are dual individually controlled elevators 28 that can be raised and lowered to control pitch and roll. The elevators 28 rotate about a horizontal axis at the forward edge of the elevators 28, perpendicular to the craft's direction of travel.

Hydrofoil

A V-shaped hydrofoil wing 18 preferably includes three servo actuators 24, two outboard spars 25, two hydrofoil segments 26 and a central spar 27. The hydrofoil segments 26 are arranged in a V-spread configuration. The V-shaped hydrofoil wing 18 is continuously adjustable and can be securely fixed in any position by three servo actuators 24. The outboard spars 25 rotate about horizontal axes parallel to the craft's direction of travel. The rotating outboard spars 25 provide a moving locator for one end of each hydrofoil segment 26. The hydrofoil segments 26 are attached to each other at a single, centrally located, horizontal pivot point 19, parallel to the direction of travel of the watercraft 1. This pivot point 19 is also attached to one end of the central spar 27. Each spar 25, 27 is controlled by servos actuators 24 that can be locked in any position. The V-shaped hydrofoil wing 18 is positively lockable in any desirable position. The positively locking feature of the V-shaped hydrofoil wing 18 also eliminates side-thrust on the central spar 27 allowing a thin, low drag, cross section. Exact positioning of the V-shaped hydrofoil wing 18 is controlled by the three servo actuators operating in concert to move the hydrofoil segments 26. Hydrofoil lift is provided by the cross-sectional shape of the two hydrofoil segments 26 as illustrated in FIG. 7. Direction of lift F varies with the magnitude of extension of the V-shaped hydrofoil wing 18, and angle of the V-shaped hydrofoil wing 18. At minimum extension of the V-shaped hydrofoil wing 18, the lifting force or vector is nearly vertical, angled toward the center of the watercraft 1.

Transition from Mode to Mode

The vertical component of the force vector is maximized at minimal extension allowing transition to hydrofoil mode even in shallow water. Should the watercraft 1 roll to either side, the force vectors change direction, with the force on the lower side of the watercraft 1 moving to a more vertical position. Consequently, the lift on the lower side of the V-shaped hydrofoil wing 18 increases and tends to right the vessel. This self-righting design stabilizes the watercraft 1 in hydrofoil mode for safer operation. When the V-shaped hydrofoil wing 18 is fully retracted, it is flush with and fully within the lower section of the cabin. In this position, draft requirement is minimized allowing the watercraft 1 to operate in shallow water, near a dock, or execute a beach landing.

Control Signals

Figure 10:
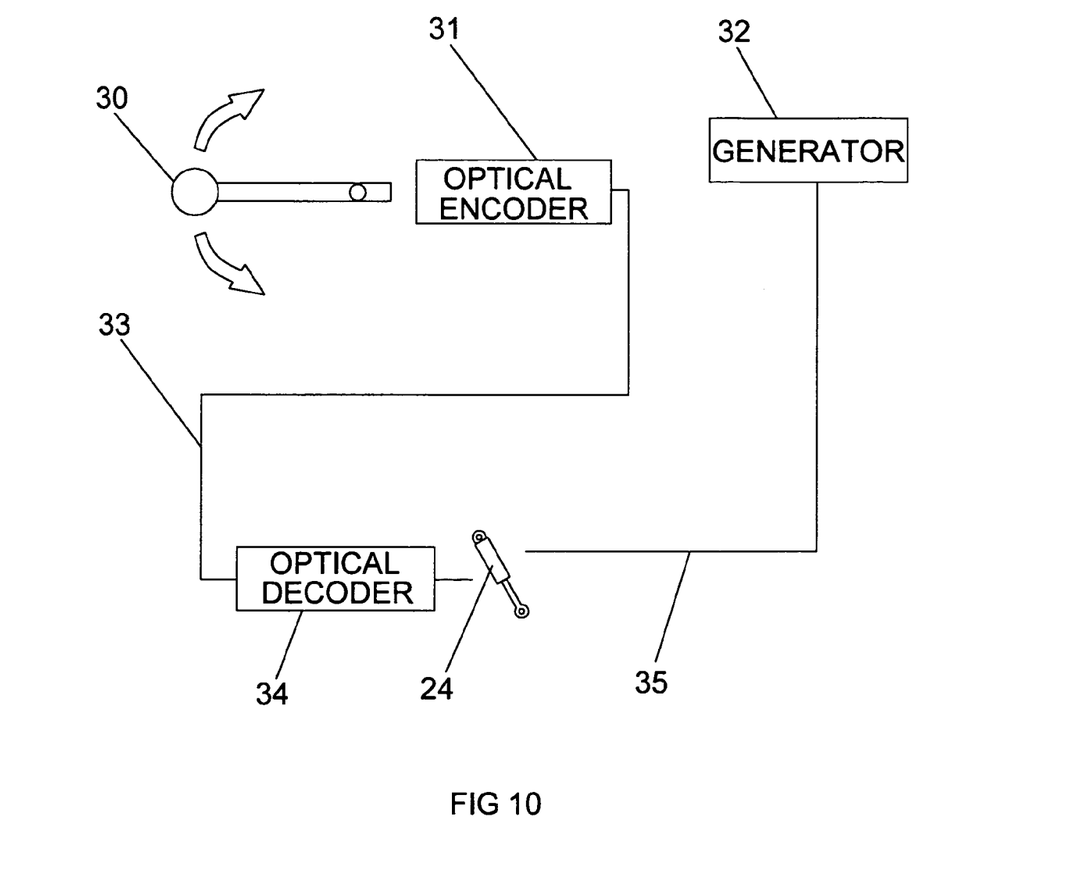
FIG. 10 is a schematic diagram of fly-by-fiber controls of a watercraft.
Figure 11:
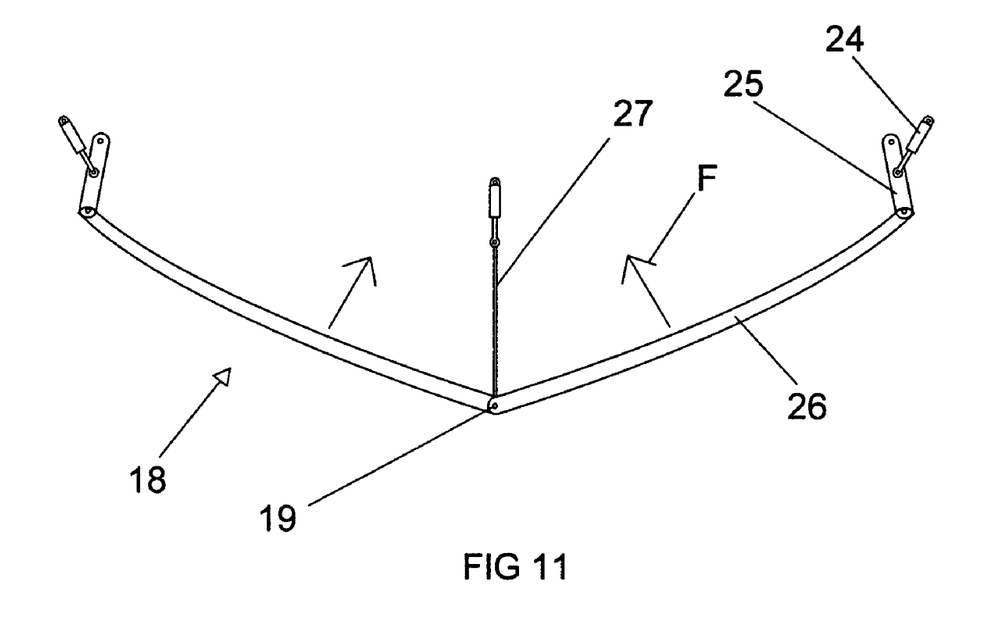
FIG. 11 is a front view of V-shaped hydrofoil wing and angled force vectors of a watercraft.

All control signals operate through a redundant fiber-optic network 33. Power to the servo actuators 24 is provided through separate wiring 35 and a generator 32, totally isolated from control signals. Optical encoders 31 translate the operator's action on hand or foot controls 30, switches, or touch-screens, to optical signals. These signals are transmitted through the fiber-optic network 33 to optical decoders 34 providing signal control of the servo actuators 24. Signal feedback reverses the sequence and provides instrument displays to the operator showing the status of all control surfaces and elements (engine speed, prop pitch, elevator position, and position of the V-shaped hydrofoil wing 18. In addition, strain gages (not shown for simplicity) are fitted to all stress members, providing information to the operator as the watercraft 1 transitions from displacement to hydrofoil mode to ground-effect mode. For instance, at rest, the watercraft 1 is supported by simple buoyancy. As speed increases and the V-shaped hydrofoil wing 18 is deployed, the airfoil hull 23 clears the water and nearly 100% of the craft weight is supported by the V-shaped hydrofoil wing 18, and can be measured with the strain gages. At higher speeds, the airfoil hull 23 gradually assumes the duty of lifting. The strain gages provide the operator information on this transition indicating when to fully retract the V-shaped hydrofoil wing 18.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A high-speed watercraft comprising:
   a hull having an exterior that is substantially the shape of an airfoil, said hull having a front and a rear;
   a pair of struts being located at said rear of said hull, a pair of nacelles being secured to said pair of struts, each one of said pair of nacelles including a rear facing propeller, each of said propellers including variable pitch, said propellers enabling in-place rotation of said watercraft;
   a pair of elevators extending from a rear edge of said hull;
   a fly-by fiber control system for isolation of electrical noise from other control systems in said watercraft; and
   a V-shaped hydrofoil wing being mounted to a bottom of said hull, said V-shaped hydrofoil wing having an adjustable center depth and two hydrofoil segments with a cross section having a airfoil cross section, said V-shaped hydrofoil wing being lockable at any extension position, said V-shaped hydrofoil extending substantially a width of said hull.

2. The high-speed watercraft of claim 1, further comprising:
   a bottom of said hull being suitable for travel over ground.

3. The high-speed watercraft of claim 1, further comprising:
   said hull having a shape that provides lift for said hydrofoil watercraft at higher speeds.

4. The high-speed watercraft of, claim 1, further comprising:
   said strut having an airfoil shaped cross-section.

5. A high-speed watercraft comprising:
   a hull having an exterior that is substantially the shape of an airfoil, said hull having a front and a rear;
   a pair of struts being located at said rear of said hull, a pair of nacelles being secured to said pair of struts, each one of said pair of nacelles including a rear facing propeller, each of said propellers including variable pitch, said propellers enabling in-place rotation of said watercraft;
   a pair of elevators extending from a rear edge of said hull;
   a bottom of said hull being suitable for travel over ground;
   a fly-by fiber control system for isolation of electrical noise from other control systems in said watercraft; and
   a V-shaped hydrofoil wing being mounted to a bottom of said hull, said V-shaped hydrofoil wing having an adjustable center depth and two hydrofoil segments with a cross section having a airfoil cross section, said V-shaped hydrofoil wing being lockable at any extension position, said V-shaped hydrofoil extending substantially a width of said hull.

6. The high-speed watercraft of claim 5, further comprising:
said hull having a shape that provides lift for said hydrofoil watercraft at higher speeds.

7. The high-speed watercraft of claim 5, further comprising:
said strut having an airfoil shaped cross-section.

8. A high-speed watercraft comprising:
a hull having an exterior that is substantially the shape of an airfoil, said hull having a front and a rear;
a pair of angled struts being located at said rear of said hull, a pair of nacelles being secured to said pair of struts, each one of said pair of nacelles including a rear facing propeller, each of said propellers including variable pitch, said propellers enabling in-place rotation of said watercraft;
a pair of elevators extending from a rear edge of said hull;
a bottom of said hull being suitable for travel over ground;
a fly-by fiber control system for isolation of electrical noise from other control systems in said watercraft; and
a V-shaped hydrofoil wing being mounted to a bottom of said hull, said V-shaped hydrofoil wing having an adjustable center depth and two hydrofoil segments with a cross section having a airfoil cross section, said V-shaped hydrofoil wing being lockable at any extension position, said V-shaped hydrofoil extending substantially a width of said hull.

9. The high-speed watercraft of claim 8, further comprising:
said hull having a shape that provides lift for said hydrofoil watercraft at higher speeds.

10. The high-speed watercraft of claim 8, further comprising:
said angled strut having an airfoil shaped cross-section.

* * * * *